United States Patent [19]  [11] 4,102,577
Suzuki et al. [45] Jul. 25, 1978

[54] METHOD OF FORMING MOIRE CONTOUR LINES

[75] Inventors: Masane Suzuki; Kiyoshi Suzuki, both of Omiya, Japan

[73] Assignee: Fuji Photo Optical Co., Ltd., Omiya, Japan

[21] Appl. No.: 755,728

[22] Filed: Jan. 4, 1977

[51] Int. Cl.$^2$ .......................................... G01B 11/24
[52] U.S. Cl. ................... 356/169; 250/237 G; 350/6.5; 350/285
[58] Field of Search ............. 350/6, 285, 289, 6.5; 356/156, 158, 167, 169; 250/237 G

[56] References Cited

U.S. PATENT DOCUMENTS 3,614,237  10/1971  Kyle et al. ........................... 356/169
3,619,064  11/1971  Brooks et al. ........................ 356/156

FOREIGN PATENT DOCUMENTS 12,709/72  11/1967  Japan .................................. 356/156

*Primary Examiner*—John K. Corbin
*Assistant Examiner*—R. A. Rosenberger

[57] ABSTRACT

A light beam is periodically chopped and then converted to a plane of light by a cylindrical lens. As the plane of light is chopped, it is caused to scan an object in the direction normal to the plane of the light to form a grating pattern on the object. The image of the grating formed on the object is superposed with a standard grating to obtain a moire pattern which represents the moire contour lines of the object.

4 Claims, 2 Drawing Figures

U.S. Patent  July 25, 1978  4,102,577
F I G. 1
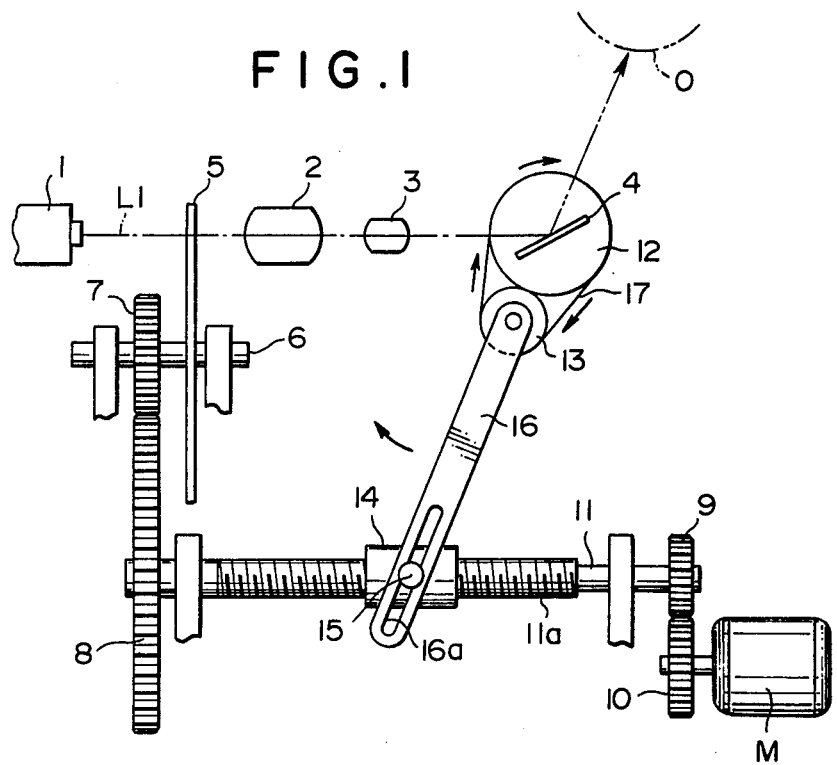
F I G. 2
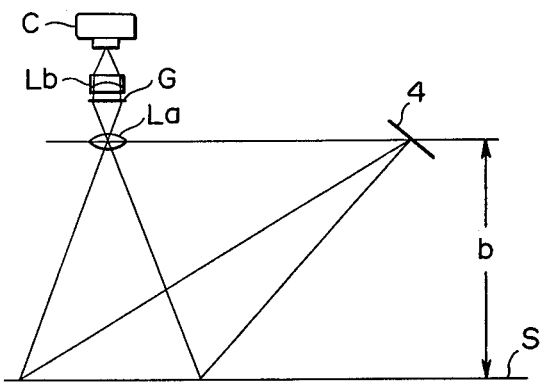

METHOD OF FORMING MOIRE CONTOUR LINES

BACKGROUND OF THE INVENTION

1. Field of the Invention

This invention relates to a method of forming a moire pattern of contour lines representing the three dimensional surface configuration of an object, and more particularly to a method of obtaining moire contour lines of a large object by use of light scanning means.

2. Description of the Prior Art

It has been known in the art to obtain a moire pattern of contour lines representing the three dimensional surface configuration of an object. In one conventional method of obtaining moire contour lines, a grating is placed in front of the object to form a shadow of the grating on the surface of the object. The shadow of the grating is distorted by the surface of the object and forms a moire pattern when superposed with said grating. In another conventional method, the image of a grating is projected through a projection lens system onto the surface of the object. The image projected on the object is distorted by the surface of the object and forms a moire pattern when superposed with said grating. In both the known methods, it is difficult to obtain a moire pattern representing the surface configuration of a large object. In the former method, the grating must be as large as the object. In the latter method, the larger is the object, the more difficult it is to prepare a projection lens system which is capable of enlarging the image of the grating to the required size. Further, in the latter method, the pitch of the grating cannot be reduced beyond the certain limit because of the diffraction phenomenon.

SUMMARY OF THE INVENTION

In view of the above defects inherent in the conventional methods, it is the primary object of the present invention to provide a method of forming moire contour lines representing the surface configuration of a large object and having comparatively small pitch.

It is another object of the present invention to provide a method of forming moire contour lines representing the surface configuration of a large object and having without using a projection lens to form a standard grating pattern on the object.

It is still another object of the present invention to provide a method of forming moire contour lines representing the surface configuration of a large object and having without using a large-sized standard grating to form a grating pattern on the object.

The above objects are accomplished by using a light plane scanning means which projects onto the object a plane of light which is successively displaced in the direction normal to itself to form a grating of small pitch on the object. The pattern is distorted by the surface configuration of the object. The image of the object with the distorted pattern is superposed with a standard grating to form moire contour lines. Since the grating pattern is formed on the object by projecting onto the object a successively displaced plane of light, no large-sized grating or image projecting optical system is required. Therefore, in accordance with the present invention, it is possible to obtain moire contour lines representing the surface configuration of a large object.

BRIEF DESCRIPTION OF THE DRAWING

FIG. 1 is a plan view showing a light plane projecting device used for carrying out the method of the present invention, and FIG. 2 is a schematic plan view showing an optical system which is used for obtaining moire contour lines representing the surface configuration of an object in accordance with the present invention.

DESCRIPTION OF THE PREFERRED EMBODIMENT

FIG. 1 shows an example of a device suitable for carrying out the method of obtaining moire contour lines in accordance with the method of this invention. A light beam L1 emitted by a light source 1 such as a laser beam generator passes through a long focal length lens 2 which focuses the light beam on the surface of an object for which moire contour lines are to be obtained. A cylindrical lens 3 is located behind the long focal length lens 2 to diverge the light beam to form a plane of light. The direction of the diversion is normal to the plane of the drawing. A mirror 4 is located behind the cylindrical lens 3 to reflect the plane of light toward the object O. The mirror 4 is rotatable about a vertical axis as described in detail hereinafter.

A rotating sector 5 is inserted in the optical path of the light beam L1 between the light source 1 and the lens 2 to periodically chop the light beam L1. The sector 5 is fixed to a shaft 6 having a gear 7 which is meshed with another gear 8. The gear 8 is rotated by a motor M by way of gears 9 and 10. The gears 8 and 9 are fixed to a shaft 11 which has a screw 11a thereon. On the screw 11a is mounted a slidable member 14 having a threaded hole meshed with said screw 11a so that the slidable member 14 moves along the shaft 11 as the screw 11a rotates together with the shaft 11. Said mirror 4 is mounted on a pulley 12 which is connected with another pulley 13 by means of an endless belt 17. A lever 16 is fixed at one end to the second pulley 13 in such manner that the lever 16 and the second pulley 13 rotate as one body about the axis of the second pulley 13. The lever 16 has an elongated slot 16a in the other end thereof which is engaged with a pin 15 fixed to said slidable member 14. Thus, as the shaft 11 rotates, the slidable member 14 moves along the shaft 11 and the lever 16 swings about the axis of the second pulley 13 to rotate the pulley 12 and the mirror 4 via the belt 17. The mirror 14 is mounted on the pulley 12 at such a position that the surface of the mirror 4 extends over the center of rotation of the pulley 12 and the surface thereof intersects with the light beam L1 from the light source 1 at the center of rotation of the pulley 12.

Thus, as the shaft 11 rotates, the mirror 4 varies the direction of reflection of the plane of light in the direction normal to the plane of light. While the mirror 4 varies the direction of reflection, the sector 5 periodically chops the light beam L1 to make the light intermittently impinge upon the object O. Therefore, the plane of light is projected on the object O intermittently so that the result is the projection of parallel light planes which collectively simulate the projection of the image of a grating. Accordingly, by superposing the pattern projected on the object O which is distorted by the surface configuration of the object O with a standard grating, a moire pattern representing the contour lines of the surface of the object O is obtained.

In the above described arrangement of the device as shown in FIG. 1, it is important that the diameter of the first pulley 12 is twice as large as that of the second pulley 13 so that the angular velocity of the first pulley is a half of that of the second pulley. Since the angle of reflection of the light reflected by the rotating mirror 4 varies at an angular velocity twice as high as that of the rotation of the pulley 12, the angular velocity of the variation in the direction of the light plane reflected by the mirror 4 is made equal to that of the rotation of the lever 16. Thus, it is assured that the direction of reflection of the plane of light reflected by the mirror 4 is always parallel to the direction of the lever 16 as shown in FIG. 1. Since the slidable member 14 slides along the shaft 11 at a constant speed as the screw 11a rotates, the position where the plane of light intersects with the surface of the object O (assuming that the surface of the object O extends in parallel to the shaft 11) also moves at a constant speed in the direction opposite to the direction in which the slidable member 14 slides. Therefore, the pitch of the parallel light planes projected onto the object O becomes constant. In other words, since the sector 5 rotates at a constant speed and chops the light beam L1 periodically and the position where the plane of light from the mirror 4 intersects with the surface of the object O moves at a constant speed, the grating pattern formed on the surface of the object O consists of a number of parallel lines arranged at equal intervals.

An optical system used for obtaining a moire pattern is illustrated in FIG. 2, wherein a standard grating G is located between a projection lens La and a condenser lens Lb and a camera C is provided behind the condenser lens Lb. The standard plane of the object O is indicated by S. The distance between the projection lens La and the standard plane S is indicated by b and is set to be equal to the distance between the standard plane S and the center of rotation of the mirror 4. In this case, the pitch $P_1$ of the grating projected on the standard plane S is determined to satisfy the following formula wherein $P_0$ is the pitch of the standard grating G and $f$ is the focal length of the projection lens La.

$$P_1/P_0 = (b - f)/f \qquad (1)$$

By forming a grating pattern on the standard plane S by use of the light plane scanning means as described hereinabove with reference to FIG. 1 while satisfying the above formula (1), the pattern distorted by the surface configuration of the object is superposed on the grating G to form a moire pattern representing the surface configuration of the object. Thus, the moire pattern or moire contour lines are recorded in the camera C.

In the above described embodiment of the present invention, the light beam emitted by the light source 1 is converted to a plane of light by a cylindrical lens. However, it will be understood by those skilled in the art that the light beam may be made to scan the object by use of a rotating mirror or the like. The scanning direction of the light in this case is vertical, that is, parallel to said plane of light in the embodiment shown in FIG. 1. In this specification, the vertically scanning light beam which results in formation of the equivalent of a plane of light is also referred to as a plane of light.

We claim:

1. A method of forming a moire contour line pattern representing the surface configuration of a three-dimensional object comprising the steps of:

generating a light beam, periodically chopping the light beam at a given frequency, converting said light beam into a plane of light directed to an object, causing said plane of light to scan in the direction normal to itself as said chopping proceeds thereby forming, in result, an image of a grating on the object, and superposing said image of the grating with a standard grating to form a moire pattern which represents the surface configuration of said object.

2. A method of forming a moire contour line pattern as defined in claim 1 wherein said step of converting the light beam into a plane of light comprises passing the light beam through a cylindrical lens.

3. A method of forming a moire contour line pattern as defined in claim 1 wherein said step of causing the plane of light to scan comprises reflecting the plane of light with a rotating mirror.

4. A method of forming a moire contour line pattern as defined in claim 1 wherein said step of superposing said image of the grating with a standard grating comprises projecting the image of the grating on the standard grating by use of a projection lens.

* * * * *